United States Patent
Sharma et al.

(10) Patent No.: US 9,825,918 B2
(45) Date of Patent: Nov. 21, 2017

(54) CONTROLLER AREA NETWORK (CAN) DEVICE AND METHOD FOR OPERATING A CAN DEVICE

(71) Applicant: NXP B.V., Eindhoven (NL)

(72) Inventors: Vibhu Sharma, Eindhoven (NL);
Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 124 days.

(21) Appl. No.: 14/812,909

(22) Filed: Jul. 29, 2015

(65) Prior Publication Data

US 2016/0344703 A1  Nov. 24, 2016

Related U.S. Application Data

(63) Continuation-in-part of application No. 14/720,132, filed on May 22, 2015.

(51) Int. Cl.
*G06F 21/00* (2013.01)
*H04L 29/06* (2006.01)
(Continued)

(52) U.S. Cl.
CPC ...... *H04L 63/0428* (2013.01); *G06F 13/4282* (2013.01); *G06F 21/567* (2013.01);
(Continued)

(58) Field of Classification Search
CPC .......... H04L 63/0428; H04L 12/40032; H04L 63/1408; H04L 63/168; H04L 2012/40215;
(Continued)

(56) References Cited

U.S. PATENT DOCUMENTS 6,314,351 B1   11/2001   Chutorash
6,654,351 B1   11/2003   Casey
(Continued)

FOREIGN PATENT DOCUMENTS

CN   101026527 A   8/2007
EP   2797263 A1   10/2014
(Continued)

OTHER PUBLICATIONS

Van Herrewege, A. et al.; "CANAuth—A Simple, Backward Compatible Broadcast Authentication Protocol for CAN bus"; In ECRYPT Workshop on Lightwent Cryptography; 7 pgs; 2011.
(Continued)

*Primary Examiner* — Yogesh Paliwal
(74) *Attorney, Agent, or Firm* — Rajeev Madnawat

(57) ABSTRACT

Embodiments of a device and method are disclosed. In an embodiment, a Controller Area Network (CAN) device includes a security module connected between a CAN bus interface of a CAN transceiver and a microcontroller communications interface of the CAN transceiver and a shield device connected between the CAN bus interface and the microcontroller communications interface. The security module is configured to perform a security function on data traffic received from the CAN bus interface or from a Serial Peripheral Interface (SPI) interface of the microcontroller communications interface. The shield device is configured to direct CAN Flexible Data-rate (FD) traffic received from the CAN bus interface to the security module.

19 Claims, 15 Drawing Sheets

(51) Int. Cl.
*G06F 13/42* (2006.01)
*G06F 21/56* (2013.01)
*H04L 12/40* (2006.01)

(52) U.S. Cl.
CPC .... *H04L 12/40032* (2013.01); *H04L 63/1408* (2013.01); *H04L 63/168* (2013.01); *H04L 2012/40215* (2013.01); *H04L 2012/40273* (2013.01)

(58) Field of Classification Search
CPC ....... H04L 2012/40273; G06F 13/4282; G06F 21/567
USPC ........................................................ 713/153
See application file for complete search history.

(56) References Cited

U.S. PATENT DOCUMENTS

| | | | |
|---|---|---|---|
| 7,885,405 | B1 | 2/2011 | Bong |
| 2003/0223586 | A1* | 12/2003 | Green ................... H04L 63/029 380/283 |
| 2005/0113068 | A1 | 5/2005 | Hoffmann |
| 2005/0138386 | A1* | 6/2005 | Le Saint ............. H04L 63/0823 713/185 |
| 2011/0093639 | A1* | 4/2011 | Richards ........... H04L 12/40032 710/310 |
| 2012/0271975 | A1 | 10/2012 | Elend et al. |
| 2012/0297105 | A1 | 11/2012 | Elend |
| 2013/0294460 | A1 | 11/2013 | Hell |
| 2014/0129748 | A1 | 5/2014 | Muth |
| 2014/0330996 | A1 | 11/2014 | De Haas et al. |
| 2014/0365693 | A1 | 12/2014 | Monroe et al. |
| 2015/0085411 | A1* | 3/2015 | Yang ....................... H02H 9/02 361/57 |
| 2015/0089236 | A1* | 3/2015 | Han ..................... H04L 9/3242 713/181 |
| 2015/0180840 | A1* | 6/2015 | Jung ..................... H04L 9/0825 713/150 |
| 2015/0358351 | A1 | 12/2015 | Otsuka et al. |

FOREIGN PATENT DOCUMENTS

| | | |
|---|---|---|
| WO | 00/09363 A1 | 2/2000 |
| WO | 2014/115455 A1 | 7/2014 |

OTHER PUBLICATIONS

Extended European Search Report for Patent Appln. No. 16180637.7 (dated Dec. 19, 2016).
Non-Final Rejection dated Jun. 15, 2017 for U.S. Appl. No. 14/954,638, 15 pages.
Non-Final Rejection dated May 11, 2017 for U.S. Appl. No. 14/720,132, 23 pages.
Van Herrewege, A. et al.; "CAN Auth—A Simple, Backward Compatible Broadcast Authentication Protocol for CAN bus"; In ECRYPT Workshop on Lightwent Cryptography; 7 pgs; 2011.
Japanese Information Technology Promotion Agency; "Approaches for Vehicle Information Security"; 55 pgs; Aug. 2013.
Koscher et al.; "Experimental security analysis of a modern automobile"; in Proc. IEEE Security Privacy. Symp.; Oakland, CA; pp. 447-462; 2010.
Checkoway, D. et al.; "Comprehensive Experimental Analysis of Automotive Attack Surfaces"; in Proceedings of the USENIX Security Symposium, San Francisco, CA; 16 pgs.; Aug. 2011.
Bosch; "CAN Specification"; version 2.0; 73 pgs.; 1991.
Bosch; SMI700 for vehicle dynamics control, 1 pg. (2015).
Bosch; "CAN with Flexible Data-Rate"; White paper, version 1.1; 16 pgs.; 2011.
Philips Semiconductors,"Product Specification PCA 82C200, Stand-alone CAN-controller", 36 pgs. (Nov. 1992).
Final Rejection dated Sep. 22, 2017, 2017 for U.S. Appl. No. 14/954,638, 21 pages.

* cited by examiner

CONTROLLER AREA NETWORK (CAN) DEVICE AND METHOD FOR OPERATING A CAN DEVICE

REFERENCE TO RELATED APPLICATIONS

This application is a Continuation-in-part of U.S. Utility application Ser. No. 14/720,132, filed May 22, 2015, entitled "In-Vehicle Network (IVN) Device and Method for Operating an IVN Device," which is incorporated by reference herein.

BACKGROUND

An in-vehicle network (IVN) is used to facilitate communications between devices, such as electronic control units (ECU), within a vehicle. Vehicles can be interconnected, for example, connected to the Internet, e.g., to provide network access to passengers within the vehicles.

SUMMARY

Embodiments of a device and method are disclosed. In an embodiment, a Controller Area Network (CAN) device includes a security module connected between a CAN bus interface of a CAN transceiver and a microcontroller communications interface of the CAN transceiver and a shield device connected between the CAN bus interface and the microcontroller communications interface. The security module is configured to perform a security function on data traffic received from the CAN bus interface or from a Serial Peripheral Interface (SPI) interface of the microcontroller communications interface. The shield device is configured to direct CAN Flexible Data-rate (FD) traffic received from the CAN bus interface to the security module.

In an embodiment, the security module includes a programmable cryptographic module configured to execute security software programs to process the data traffic received from the CAN bus interface or the SPI interface.

In an embodiment, the programmable cryptographic module is configured to encrypt input data received through the SPI interface to generate a cipher data output.

In an embodiment, the CAN device further includes a FD protocol controller configured to encode the cipher data output and the input data to generate a CAN FD frame.

In an embodiment, the CAN device further includes a FD protocol controller configured to decode the CAN FD data traffic to generate decoded data, and the programmable cryptographic module is further configured to decrypt the decoded data.

In an embodiment, the programmable cryptographic module is further configured to verify a cryptographic integrity of the decoded data and to generate and transmit an interrupt signal through the microcontroller communications interface if the cryptographic integrity of the decoded data has been successfully verified.

In an embodiment, the programmable cryptographic module includes a security core configured to execute security software routines and a memory device configured to store security configuration information for the security software routines.

In an embodiment, the security core is configured to extract a data payload from a plurality of data signals received through the microcontroller communications interface or the CAN bus interface and process the data payload to generate a Cipher-based Message Authentication Code (CMAC) digest.

In an embodiment, the CAN device further includes a FD protocol controller configured to combine the payload with the CMAC digest to generate a CAN FD frame.

In an embodiment, the shield device is connected between a receive data (RX) interface and a transmit data (TX) interface of the microcontroller communications interface and the CAN bus interface, and is further configured to block the CAN FD traffic from reaching the microcontroller communications interface if the microcontroller communications interface is used for communications with a classic CAN microcontroller.

In an embodiment, a CAN transceiver includes the CAN device, the CAN bus interface, the microcontroller communications interface, a transmitter, and a receiver.

In an embodiment, an electronic control unit includes the CAN transceiver and a microcontroller, where the microcontroller communications interface of the CAN transceiver is used for communications with the microcontroller.

In an embodiment, a CAN transceiver includes a CAN bus interface having a CAN high (CANH) bus interface and a CAN low (CANL) bus interface, a CAN microcontroller communications interface having a receive data (RX) interface, a transmit data (TX) interface and a Serial Peripheral Interface (SPI) interface, a security module connected between the CAN bus interface and the SPI interface and a shield device connected between the CAN bus interface and the RX interface and the TX interface of the CAN microcontroller communications interface. The security module is configured to perform a security function on data traffic received from the CAN bus interface or from the SPI interface. The shield device is configured to direct CAN FD traffic received from the CAN bus interface to the security module.

In an embodiment, the programmable cryptographic module includes a security core comprising at least one of a hardware-based Advanced Encryption Standard (AES) engine, a hardware-based Secure Hash Algorithm (SHA) engine, a hardware-based counter and a hardware-based true random number generator, and a memory device configured to store security configuration information for the security core.

In an embodiment, the security core is configured to extract a data payload from a plurality of data signals received through the SPI interface or the CAN bus interface and process the data payload to generate process data.

In an embodiment, the CAN transceiver further includes a FD protocol controller configured to combine the payload with the processed data to generate a CAN FD frame.

In an embodiment, the shield device is further configured to block the CAN FD traffic from reaching the CAN microcontroller communications interface if the CAN microcontroller communications interface is used for communications with a classic CAN microcontroller.

In an embodiment, the CAN transceiver further includes a FD protocol controller configured to decode the CAN FD data traffic to generate decoded data, and where the security module is further configured to decrypt the decoded data, verify a cryptographic integrity of the decoded data, and generate and transmit an interrupt signal through the microcontroller communications interface if the cryptographic integrity of the decoded data has been successfully verified.

In an embodiment, a method for operating a CAN device involves performing a security function on data traffic received from a CAN bus interface of a CAN transceiver or from a microcontroller communications interface of the CAN transceiver using a security module of the CAN device connected between the CAN bus interface and the microcontroller communications interface and directing CAN FD traffic received from the CAN bus interface to the security module using a shield device that is connected between the CAN bus interface and the microcontroller communications interface.

In an embodiment, performing the security function on the data traffic received from the CAN bus interface or the microcontroller communications interface includes executing security software programs to encrypt or decrypt the data traffic received from the CAN bus interface or the microcontroller communications interface.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
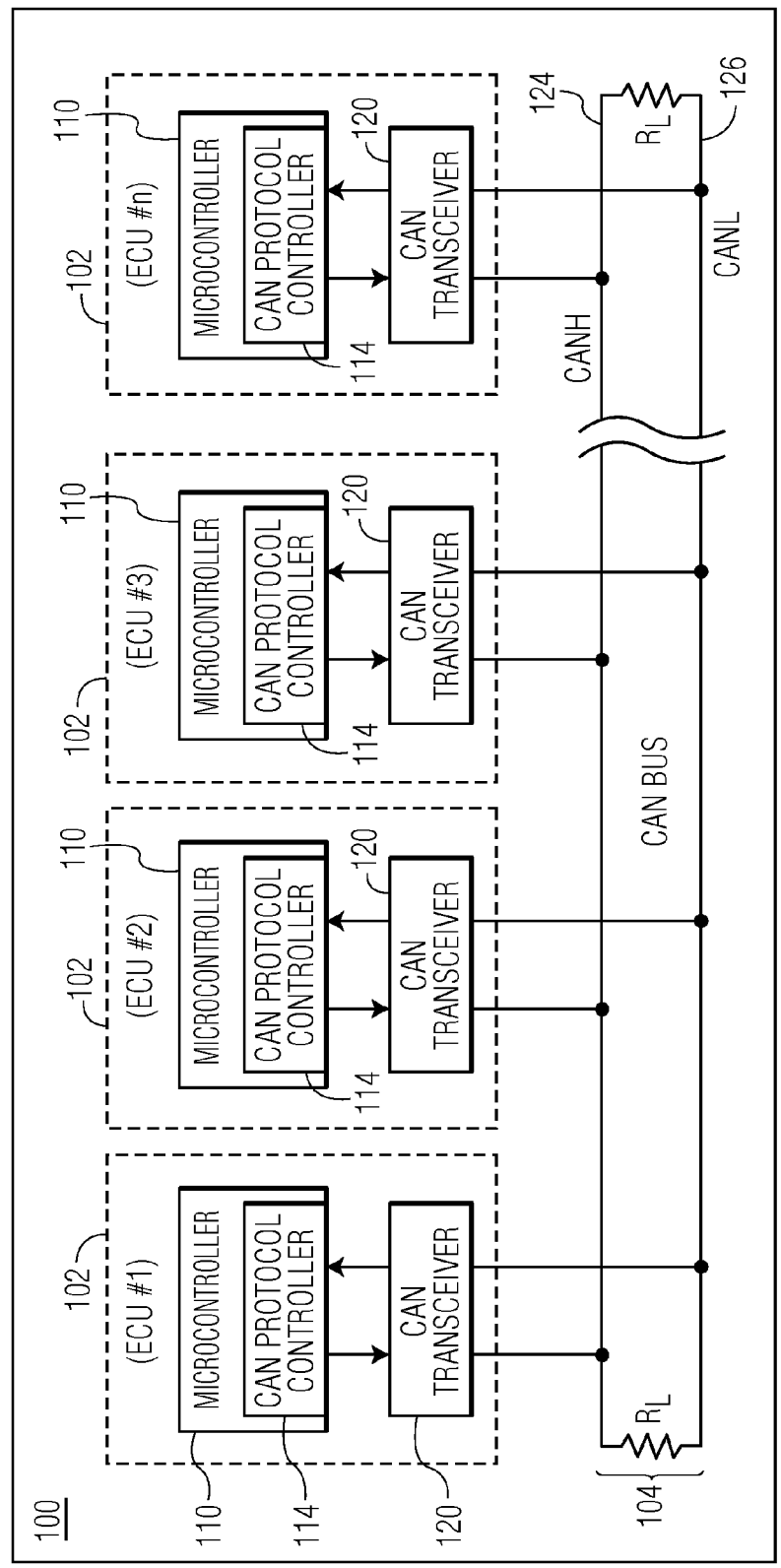
FIG. 1 depicts a CAN network that includes multiple electronic control units (ECUs), each connected to a CAN bus.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Techniques described herein can be applied to any type of in-vehicle networks (IVNs), including a Controller Area Network (CAN), a Local Interconnect Network (LIN), a Media Oriented Systems Transport (MOST) network, a FlexRay™ compatible network, and other types of IVNs. Although in some embodiments a specific type of IVN is described, it should be noted that the invention is not restricted to a specific type of IVN.

FIG. 1 depicts a CAN network 100 that includes multiple ECUs 102, also referred to as "nodes," each connected to a CAN bus 104. The CAN bus is a message-based communications bus protocol that is often used within automobiles. In some vehicles, the CAN bus is the primary automotive networking protocol for power train, backbone bus and body electronics. For example, the CAN bus protocol is used to enable communications between various ECUs, such as an engine control module (ECM), a power train control module (PCM), airbags, antilock brakes, cruise control, electric power steering, audio systems, windows, doors, mirror adjustment, battery and recharging systems for hybrid/electric cars, and many more. The data link layer of the CAN protocol is standardized as International Standards Organization (ISO) 11898-1. The standardized CAN data link layer protocol is in the process of being extended to provide higher data rates. The extended protocol, referred to as CAN Flexible Data-Rate or "CAN FD," is moving towards standardization in the form of an update of the existing ISO 11898-1 standard. The emerging working draft (WD) of the ISO 11898-1 standard is described in the document, CAN with Flexible Data-Rate, Specification Version 1.0, released Apr. 17, 2012, and is being referred to as ISO 11898-1 WD. Although the network 100 depicted in FIG. 1 is described as a CAN network, the techniques described herein can be applied to any type of IVNs, such as a LIN network or a FlexRay™ compatible network.

In the embodiment of FIG. 1, each ECU 102 includes a microcontroller (MCU) 110 having an embedded CAN protocol controller 114 and a CAN transceiver 120. The microcontrollers are typically connected to at least one device such as a sensor, an actuator, or some other control device and are programmed to determine the meaning of received messages and to generate appropriate outgoing messages. The microcontrollers, also referred to as host processors or digital signal processors (DSPs), are known in the field. In some embodiments, at least one microcontroller does not include a CAN protocol controller. In these embodiments, the microcontroller directly accesses its corresponding CAN transceiver.

The CAN protocol controllers 114, which can be embedded within the microcontrollers 110 or external to the microcontrollers, implement data link layer operations as is known in the field. For example, in receive operations, a CAN protocol controller stores received serial bits from the transceiver until an entire message is available for fetching by the microcontroller. The CAN protocol controller can also decode the CAN frames according to the standardized frame format. In transmit operations, the CAN protocol controller receives messages from the microcontroller and transmits the messages as serial bits in CAN frame format to the CAN transceiver.

The CAN transceivers 120 are located between the microcontrollers 110 and the CAN bus 104 and implement physical layer operations. For example, in receive operations, a CAN transceiver converts analog differential signals from the CAN bus to serial digital signals that the CAN protocol controller can interpret. The CAN transceiver also protects the CAN protocol controller from extreme electrical conditions on the CAN bus, e.g., electrical surges. In transmit operations, the CAN transceiver converts serial digital bits received from the CAN protocol controller into analog differential signals that are sent on the CAN bus.

The CAN bus 104 carries analog differential signals and includes a CAN high (CANH) bus line 124 and a CAN low (CANL) bus line 126. One or more resistors, RL, may exist between the CANH bus line and the CANL bus line. The CAN bus is known in the field.

Figure 2:
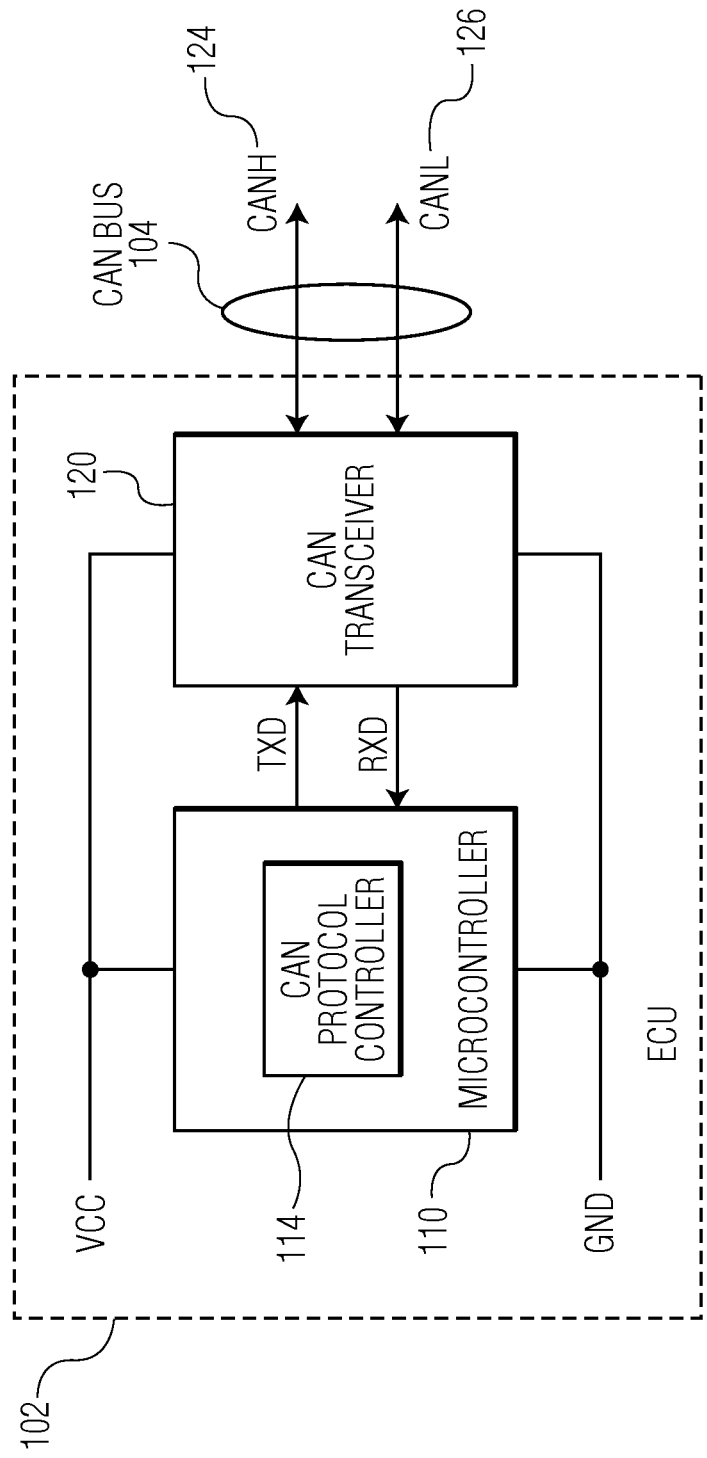
FIG. 2 depicts an expanded view of one ECU from FIG. 1.

FIG. 2 depicts an expanded view of one ECU 102 from FIG. 1. The microcontroller 110 and the CAN transceiver 120 of the ECU are connected between a supply voltage, $V_{cc}$, and ground, GND. As illustrated in FIG. 2, data communicated from the microcontroller to the CAN transceiver is identified as transmit data (TXD) and data communicated from the CAN transceiver to the microcontroller is referred to as receive data (RXD). Data is communicated to and from the CAN bus via the CANH and CANL bus lines 124 and 126, respectively.

As noted above, the CAN protocol controller 114 can be configured to support the normal mode or the flexible data rate mode. As used herein, "CAN normal mode" (also referred to as "CAN classic mode") refers to frames that are formatted according to the ISO 11898-1 standard and "CAN FD mode" refers to frames that are formatted according to the emerging ISO 11898-1 WD standard, or an equivalent thereof. The emerging ISO 11898-1 WD standard is described in the document, CAN with Flexible Data-Rate, Specification Version 1.0, released Apr. 17, 2012, which is incorporated by reference herein.

Figure 3A:
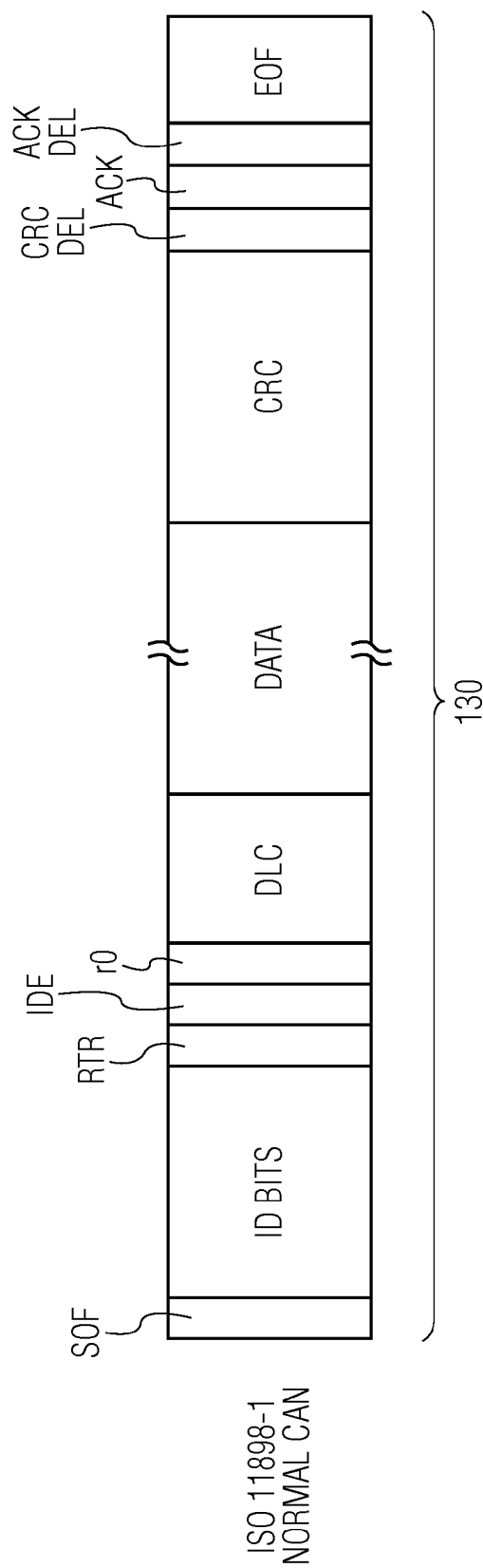
FIG. 3A depicts the format of an ISO 11898-1 frame that is used in CAN normal mode.
Figure 3B:
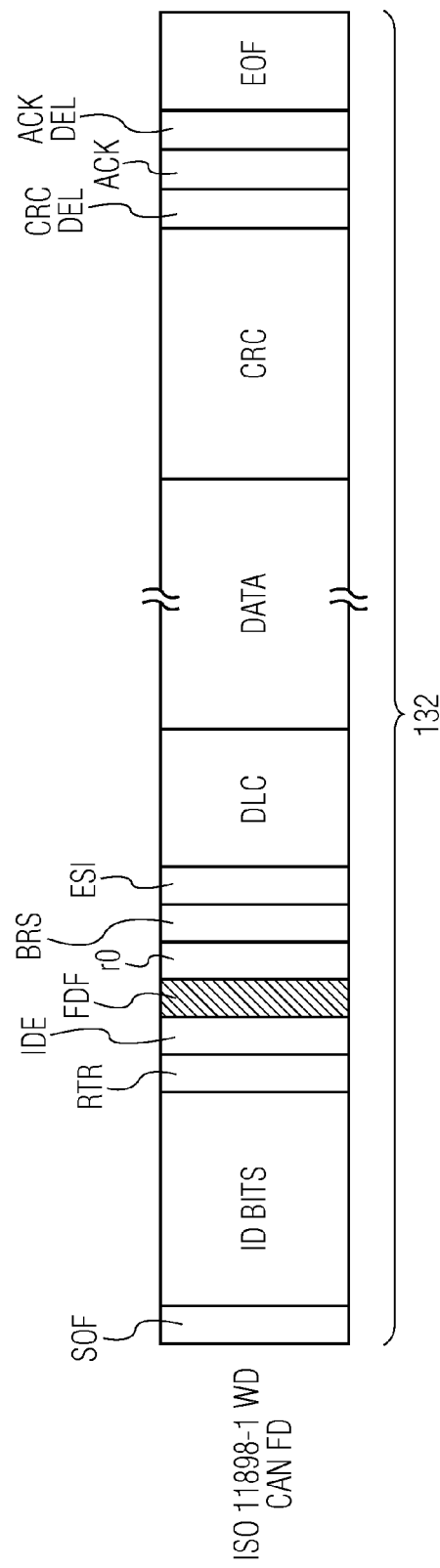
FIG. 3B depicts the format of an ISO 11898-1 WD frame that is used in CAN FD mode.

FIG. 3A depicts the format of an ISO 11898-1 frame 130 (in the classic base frame format (CBFF)) that is used in CAN normal mode and FIG. 3B depicts the format of an ISO 11898-1 WD frame 132 (in the FD base frame format) that is used in CAN FD mode. The fields of the CAN normal mode and CAN FD mode frames are defined as follows:
SOF Start of Frame (always dominant)
ID Bits Identifier Bits, defining the message content
RTR Remote transmission Request
IDE ID Extension
r0 Reserved Bit 0 (replaced by FDF in the CAN FD format)
FDF FD Format (this is the bit distinguishing the frame formats)
BRS Baud Rate Switch
ESI Error State Indicator
DLC Data Length Code
Data Data Bytes
CRC Cyclic Redundancy Check
CRC Del CRC Delimiter (always recessive)
ACK Acknowledge
ACK Del Acknowledge Delimiter
EOF End Of Frame There is also another version of the classic format, referred to as "classic extended frame format (CEFF)," in which the FDF bit is in the old r1 position, whereas the FDF bit is in the r0 position in CBFF. Of note, the CAN protocols use the reserved bit (r0 or r1) (also referred to generally as the FDF bit) within a CAN normal mode frame to identify a frame as a CAN FD mode frame. In particular, the FDF bit is a 1-bit field that indicates whether the frame is a CAN normal mode frame (ISO 11898-1) or a CAN FD mode frame (ISO 11898-1 WD). When the FDF bit is dominant (e.g., low or "0"), the frame is a CAN normal mode frame and when the FDF bit is recessive (e.g., high or "1"), the frame is a CAN FD mode frame. In a CAN normal mode frame, the reserved bits (r0, r1) are always driven dominant to the bus lines.

Conventional CAN networks are limited by data payload field of 8 Bytes. For example, the minimum length of an Advanced Encryption Standard (AES) based Cipher-based Message Authentication Code (CMAC) signature is 16 Bytes for AES-128. However, the maximum payload available in a conventional CAN network is 8 Bytes. The limited payload complicates the deployment of CMAC signatures for the message integrity in CAN networks. Splitting the CMAC signature over multiple messages can complicate the message integrity verification process at the receiver side and also increase the network traffic. In addition, the CMAC truncation results in an increased collision detection probability thereby making it easier to be guessed by a hacker.

The migration to the CAN FD format with 64 Byte payloads enables the transmission of an original message and a CMAC signature as one single packet, which prevents having to split the message (resulting in the increased network traffic) and/or having to truncate the CMAC (increased detection probability). The migration to CAN FD format requires that all of the microcontrollers of a CAN network are CAN FD compatible. However, the limited availability of CAN FD compatible microcontrollers and enormous effort (MCU requalification) involved in the replacement process may result in a slow adoption rate of CAN FD compatible microcontrollers. In addition, CAN FD compatible microcontrollers with a hardware security module for securing the legacy nodes, such as power train and chassis, in a vehicle can be expensive and complex to implement. In addition, securing all data traffic in a CAN network can cause data throughput bottlenecks. For example, translating all plain text data inputs to secure cipher text outputs can increase network traffic. Further, the limited interface options for providing network security can also limit the data throughput rate of a CAN network.

In accordance with an embodiment of the invention, a CAN device includes a security module connected between a CAN bus interface of a CAN transceiver and a microcontroller communications interface of the CAN transceiver and a shield device connected between the CAN bus interface and the microcontroller communications interface. The security module is configured to perform a security function on data traffic received from the CAN bus interface or from the microcontroller communications interface. The shield device is configured to direct CAN FD traffic received from the CAN bus interface to the security module. By performing the security function on data traffic received from the CAN bus interface or from the microcontroller communications interface, received secure data can be decoded in the CAN device and regular data can be encoded in the CAN device for secure transmission. In addition, by directing CAN FD traffic received from the CAN bus interface to the security module, the CAN device can prevent CAN FD traffic from reaching a classic CAN microcontroller that cannot process CAN FD traffic.

Figure 4:
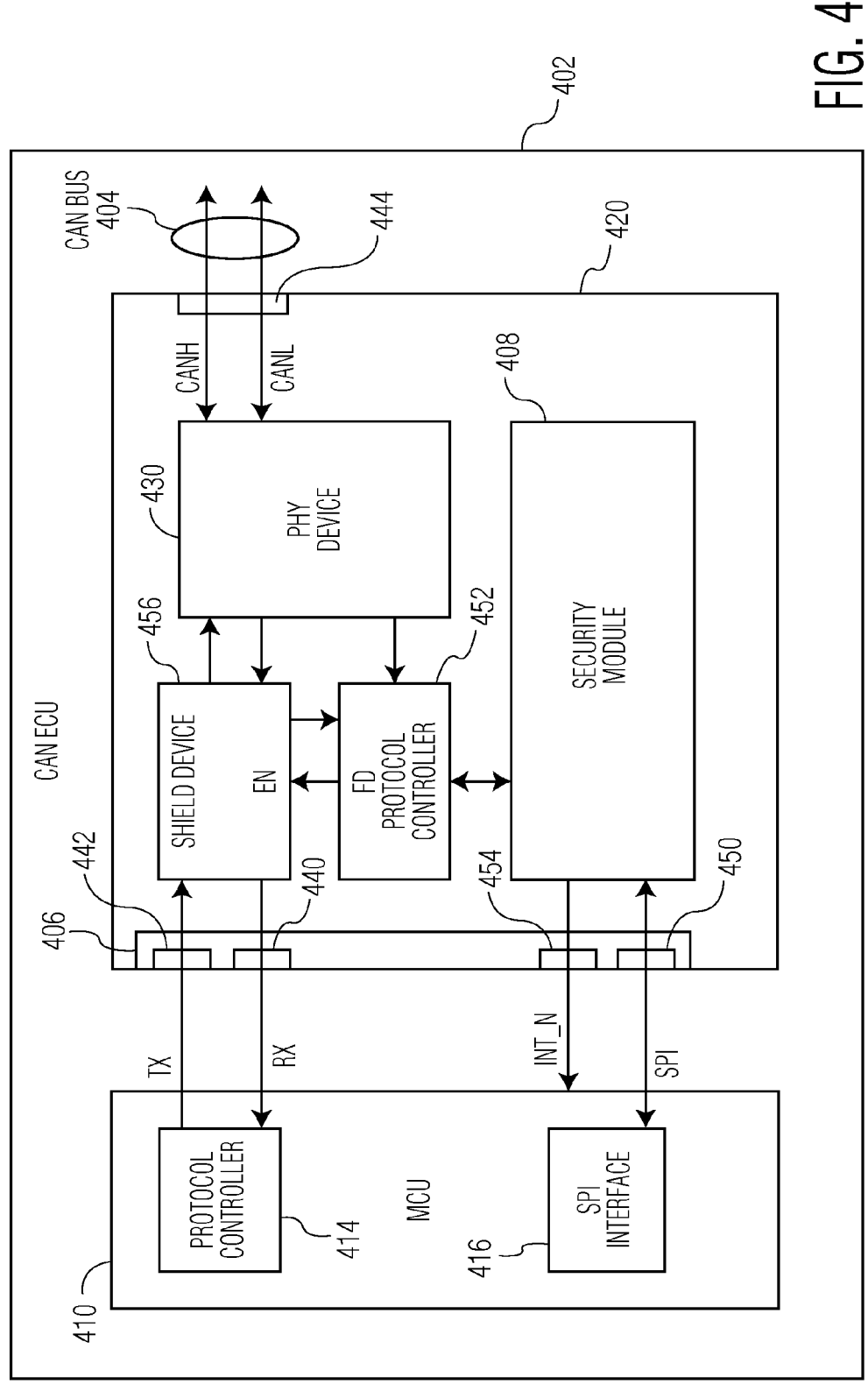
FIG. 4 depicts an embodiment of an ECU that includes a microcontroller and a transceiver.

FIG. 4 depicts an embodiment of a CAN ECU 402 that includes a microcontroller (MCU) 410 and a transceiver 420. The transceiver may be any type of IVN transceiver, such as a CAN transceiver, a LIN transceiver, a MOST network transceiver, a FlexRay™ compatible transceiver, or another type of IVN transceiver. The transceiver 420 can be used with a classic CAN microcontroller or a CAN FD compatible microcontroller. No software updates to the microcontroller are needed to enable a classic CAN microcontroller or a CAN FD compatible microcontroller to use the transceiver.

In the CAN ECU depicted in FIG. 4, the microcontroller 410 includes a protocol controller 414 and a SPI interface 416. Although the microcontroller is shown in FIG. 4 as including the SPI interface, in other embodiments, the microcontroller includes an Inter-Integrated Circuit (I2C) interface or a Direct Memory Access (DMA) interface. The microcontroller may be a classic microcontroller that can process CAN frames and cannot process CAN FD frames or a CAN FD compatible microcontroller that can process CAN frames as well as CAN FD frames.

In the CAN ECU depicted in FIG. 4, the transceiver 420 includes a microcontroller communications interface 406, a security module 408, a flexible data rate (FD) protocol controller 452, a shield device 456, and a physical communications (PHY) device 430. In an embodiment, the security module, the shield device, the FD protocol controller, and the PHY device are implemented in the same IC package, such as a single monolithic die. However, in other embodiments, the security module, the shield device, the FD protocol controller, and the PHY device are included in separate IC packages. In an embodiment, the security module and the shield device are included in the same IC package. However, in other embodiments, the security module and the shield device are included in separate IC packages. In an embodiment, the security module and the FD protocol controller are included in the same IC package. However, in other embodiments, the security module and the FD protocol controller are included in separate IC packages. In an embodiment, the security module, the shield device, and the FD protocol controller are included in the same IC package. However, in other embodiments, the security module, the shield device, and the FD protocol controller are included in two or more separate IC packages. Although the illustrated transceiver is shown with certain components and described with certain functionality herein, other embodiments of the transceiver may include fewer or more components to implement the same, less, or more functionality.

The microcontroller communications interface 406 is used for communications between the microcontroller 410 and the transceiver 420. In the embodiment depicted in FIG. 4, the microcontroller communications interface includes a receive data (RX) interface 440, a transmit data (TX) interface 442, a Serial Peripheral Interface (SPI) interface 450, and an interrupt interface 454. In some embodiments, the RX interface and the TX interface are used to communicate with the protocol controller 414 of the microcontroller. The SPI interface 450 is used to communicate with a SPI interface 416 of the microcontroller. Although the microcontroller communications interface is shown in FIG. 4 as including the SPI interface, in other embodiments, the microcontroller communications interface includes an I2C interface or a DMA interface.

The transceiver 420 provides a flexible architecture for communication of both secure and regular data messages. In an embodiment, the regular traffic from the microcontroller 410 is transferred via the TX/RX interfaces 440, 442 and the SPI interface 450 is used for the data communication requiring cryptographic operations. Consequently, a possible data throughput bottleneck is avoided by using the SPI interface only for the fraction of messages requiring security, while using the regular TX/RX interfaces for the bulk regular data communications. The SPI interface can also be used for the configuration settings in the transceiver and as a primary interface for CAN FD communication for classic CAN nodes. In an embodiment, in a reception mode of the CAN ECU 402, the shield device 456 blocks CAN FD frames for a classic CAN microcontroller. The message validation for the CAN FD frames is performed in the security module 408 and the data is transferred to the microcontroller as plain text via the SPI interface.

The security module 408 is configured to perform one or more security functions for the data traffic received from a CAN bus interface 444 of the physical communications (PHY) device or the SPI interface 450. In an embodiment, the security module is a programmable cryptographic module that can be reprogrammed (e.g., reflashed) to execute various software-based security programs. In another embodiment, the security module is a non-programmable hardware based cryptographic module for executing a particular security program that cannot be reprogrammed (e.g., reflashed) to execute other security programs. In some embodiment, the security module is the same as or similar to The security module may be the same as or similar to the security module 408 depicted in FIG. 4 of U.S. Utility application Ser. No. 14/720,132, the stream cipher module 508 depicted in FIGS. 5 and 6 of U.S. Utility application Ser. No. 14/720,132, the programmable cryptographic module 708 depicted in FIGS. 7-9 and 11 of U.S. Utility application Ser. No. 14/720,132, and/or the cryptographic module 1408 depicted in FIG. 14 of U.S. Utility application Ser. No. 14/720,132.

The FD protocol controller 452 is configured to encode input data to generate a CAN FD frame or to decode/translate a CAN FD frame. In an embodiment, the security module 408 encrypts input data received through the SPI interface 450 to generate a cipher data output and the FD protocol controller encodes the cipher data output and the input data to generate a CAN FD frame, which is transmitted through the CAN bus 404. In another embodiment, the FD protocol controller decodes CAN FD data traffic to generate decoded data and the security module decrypts the decoded data. The security module can verify the cryptographic integrity of the decoded data and generate and transmit an interrupt signal through the interrupt interface 454 if the cryptographic integrity of the decoded data has been successfully verified. In some embodiments, the FD protocol controller checks the cyclic redundancy check (CRC) code of a received CAN FD frame. If the FD protocol controller determines that the CAN FD frame does not contain transmission related errors, cipher text is recovered. Otherwise, the CAN FD frame is rejected and a rejection message is generated.

The shield device 456 is configured to direct CAN FD traffic received from the CAN bus interface 444 to the security module 408. By directing CAN FD traffic received from the CAN bus interface to the security module, the shield device can prevent CAN FD traffic from reaching a classic CAN microcontroller that cannot process CAN FD traffic. In some embodiments, the shield device blocks CAN FD traffic from reaching the microcontroller communications interface 406 if the microcontroller 410 is a classic CAN microcontroller. In an embodiment, the shield device is controlled by an enablement/disablement signal, "EN," which may be generated by the FD protocol controller 452 or the security module 408. The shield device may be the same as or similar to the traffic control system 250 depicted in FIG. 5A of U.S. Utility application Ser. No. 14/044,432, the traffic control system 250 depicted in FIG. 5A of U.S. Utility application Ser. No. 14/265,645, the traffic control system 350 depicted in FIG. 7A of U.S. Utility application Ser. No. 14/265,645, the traffic control system 450 depicted in FIG. 9 of U.S. Utility application Ser. No. 14/265,645, and/or the CAN FD shield device 551 depicted in FIG. 10 of U.S. Utility application Ser. No. 14/265,645.

The physical communications (PHY) device 430 is configured to receive signals from the CAN bus 404 through the CAN bus interface 444 with a CANH bus line and a CANL bus line and to transmit signals through the CAN bus. In some embodiments, the PHY device includes the CAN bus interface, a receiver, and a transmitter.

The transceiver 420 can address the CAN FD incompatibility dilemma for classic CAN nodes using the shield device 456. For example, the transceiver can also enable legacy classic CAN devices to utilize CAN FD to ensure message integrity (e.g., CMAC) for critical data messages. In addition, the transceiver can provide security functionality for a CAN FD compatible microcontroller. Further, dual interface options of the TX/RX interfaces 440, 442 and the SPI interface 450 can provide flexible communication paths for the regular data traffic and the security data traffic, thereby alleviating a potential data throughput bottleneck.

Figure 5:
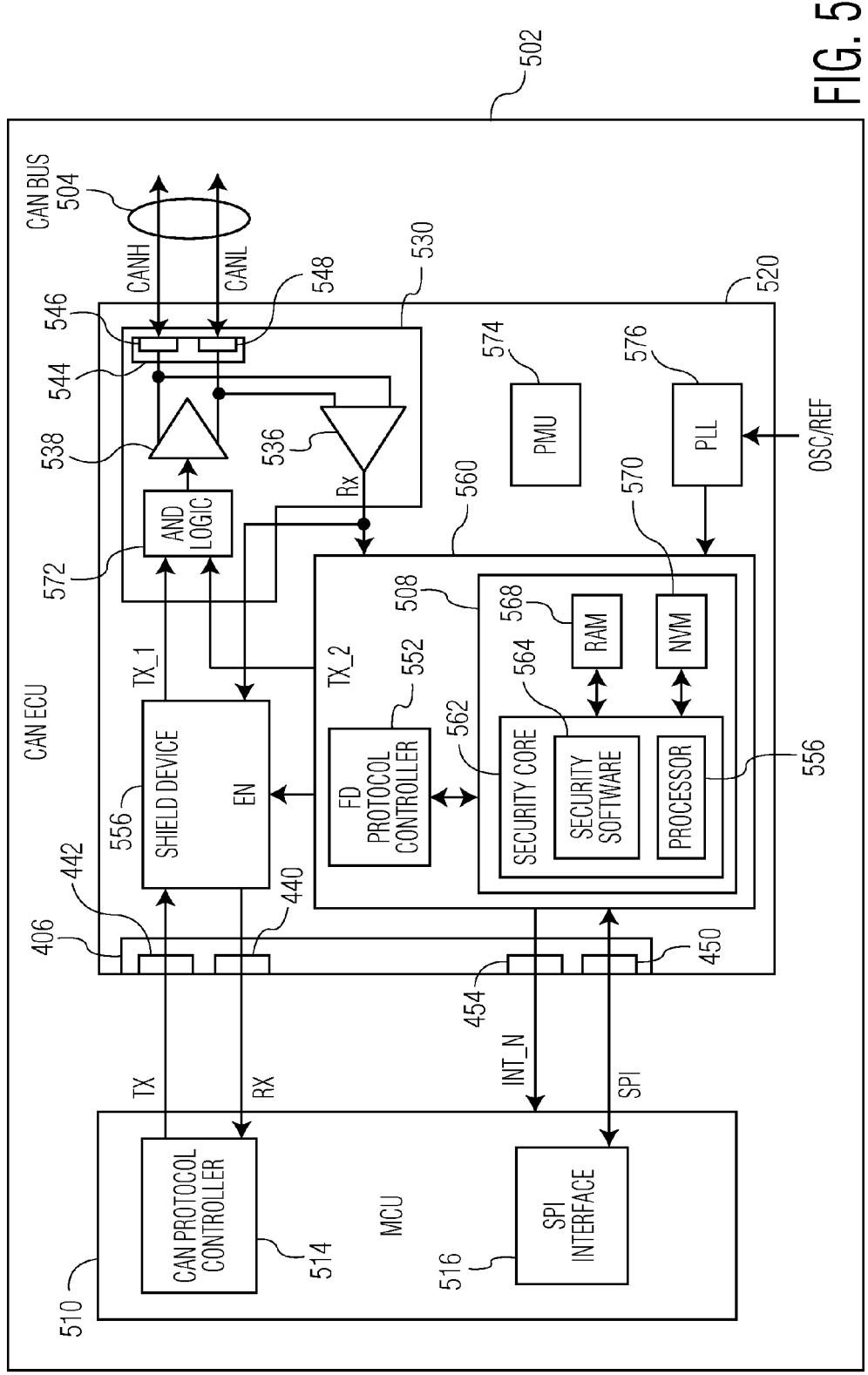
FIG. 5 depicts an embodiment of the CAN ECU depicted in FIG. 4 having a classic CAN microcontroller.

FIG. 5 depicts an embodiment of the CAN ECU 402 depicted in FIG. 4 having a classic CAN microcontroller 510 and a transceiver 520. The CAN ECU 502 depicted in FIG. 5 is one possible embodiment of the CAN ECU depicted in FIG. 4. However, the CAN ECU depicted in FIG. 4 is not limited to the embodiment shown in FIG. 5.

In the CAN ECU 502 depicted in FIG. 5, the classic CAN microcontroller 510 includes a CAN protocol controller 514 and a SPI interface 516. Although the classic CAN microcontroller is shown in FIG. 5 as including the SPI interface, in other embodiments, the classic CAN microcontroller includes an I2C interface or a DMA interface. The classic CAN microcontroller can process CAN frames and cannot process CAN FD frames.

In the CAN ECU 502 depicted in FIG. 5, the transceiver 520 includes the microcontroller communications interface 406, a programmable cryptographic module 508, a FD protocol controller 552, a shield device 556, and a physical communications (PHY) device 530. In an embodiment, the programmable cryptographic module and the FD protocol controller are included in the same IC package, such as in a processing unit 560 of the transceiver. In other embodiments, the programmable cryptographic module and the FD protocol controller are implemented in separate IC packages. In an embodiment, the programmable cryptographic module and the shield device are included in the same IC package. However, in other embodiments, the programmable cryptographic module and the shield device are included in separate IC packages.

In an embodiment, the programmable cryptographic module 508 is configured to execute software-based security programs. The programmable cryptographic module can be reprogrammed (e.g., reflashed) to execute various software-based security programs. In the embodiment depicted in FIG. 5, the programmable cryptographic module includes a security core 562 configured to execute security software routines and a volatile memory such as a random access memory (RAM) 568 and a nonvolatile memory (NVM) 570 configured to store security configuration information for the security software routines. In an embodiment, the security core includes a processor 556 and/or dedicated cryptographic hardware (HW) accelerators (e.g. encryption/decryption engines, counters and true random number generators). In an embodiment, the security core includes at least one of a hardware-based Advanced Encryption Standard (AES) engine, a hardware-based Secure Hash Algorithm (SHA) engine, a hardware-based counter and a hardware-based true random number generator. The processor can be used to perform cryptographic operations, such as AES and random number generation. In some embodiments, the processor is configured to perform message encryption using an encryption key or to perform message decryption using a decryption key. In an embodiment, the RAM and the NVM are configured to store security keys, propriety codes, and configuration settings.

The FD protocol controller 552 and the shield device 556 in the embodiment depicted in FIG. 5 perform similar or identical functions as the FD protocol controller 452 and the shield device 456 in the embodiment depicted in FIG. 4. The FD protocol controller 552 is configured to encode input data to generate a CAN FD frame or to decode/translate a CAN FD frame. The shield device 556 is configured to isolate the classic CAN microcontroller 510 from CAN FD frames by shielding CAN FD frames from directly reaching the classic CAN microcontroller. In an embodiment, the shield device is controlled by an enablement/disablement signal, EN, which may be generated by the FD protocol controller or the programmable cryptographic module.

The physical communications (PHY) device 530 is configured to receive signals from the CAN bus 504 and to transmit signals through the CAN bus. In the embodiment depicted in FIG. 5, the PHY device includes an AND logic 572, a receiver 536, a transmitter 538, a CAN bus interface 544 having a CANH bus interface 546 and a CANL bus interface 548. The AND logic provides the PHY device access to the CAN frames from the CAN protocol controller 514 of the microcontroller 510 or from the FD protocol controller 552 of the transceiver 520.

In some embodiments, the transceiver 520 includes a phase locked loop (PLL) 574 configured to match in-phase frequency of an input signal based on an oscillation frequency and a power management unit (PMU) 576 configured to perform power management functions (e.g., powering up/down, entering/exiting power-saving mode) for the transceiver.

Figure 6:
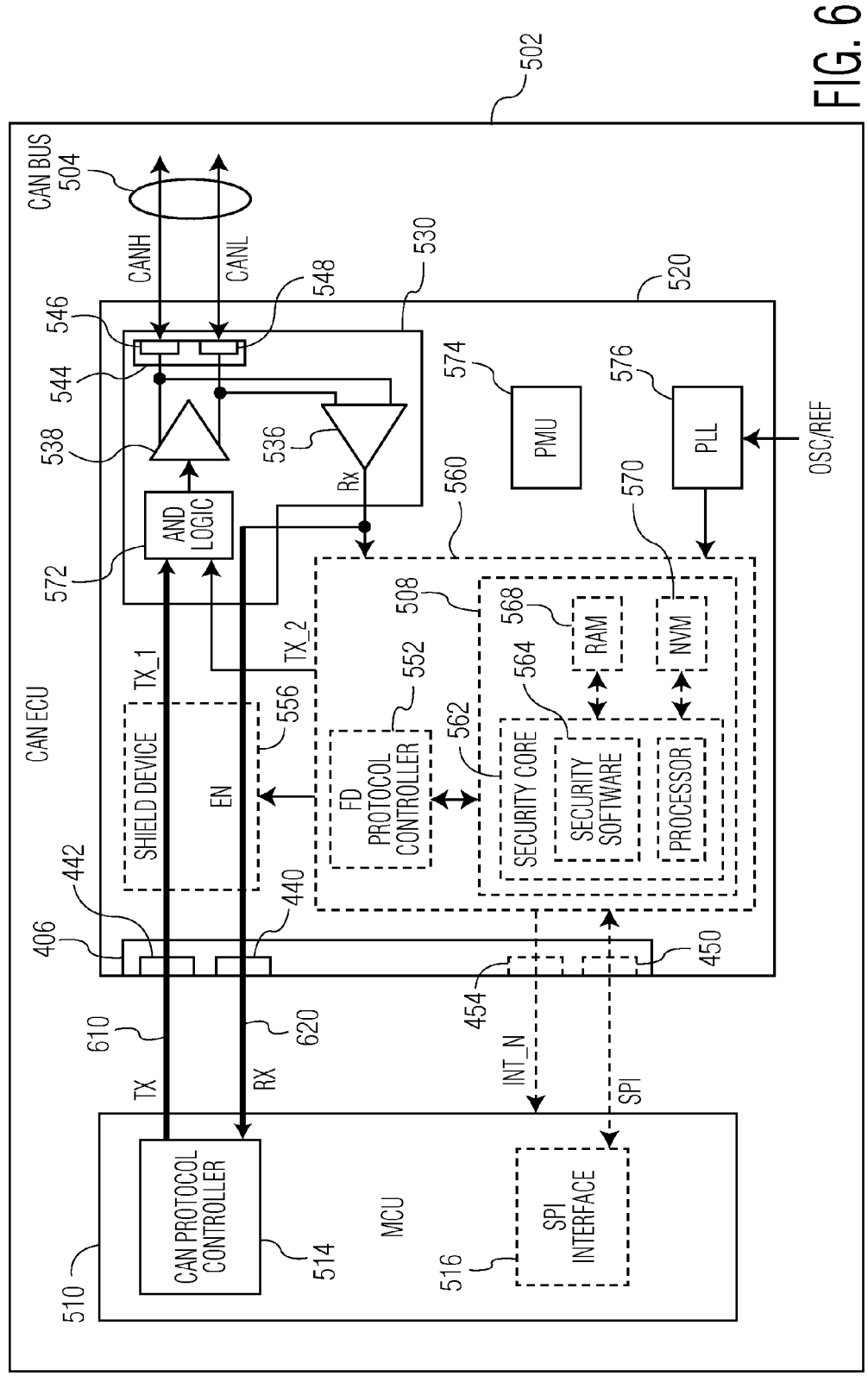
FIG. 6 illustrates an operational case of the CAN ECU of FIG. 5 for regular (non-secured) data communications.
Figure 7:
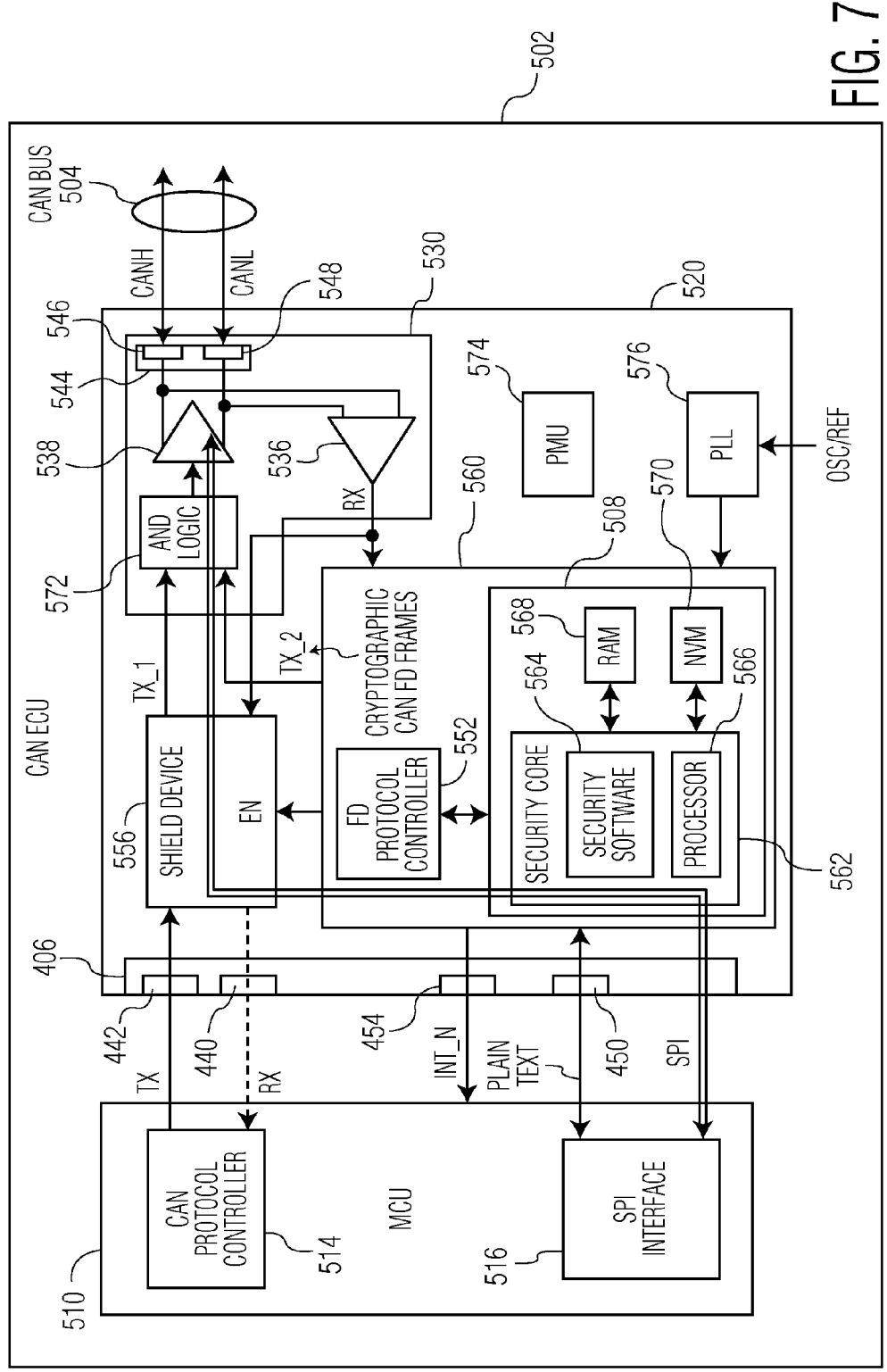
FIG. 7 illustrates an operational case of the CAN ECU of FIG. 5 for secured data communications.
Figure 8:
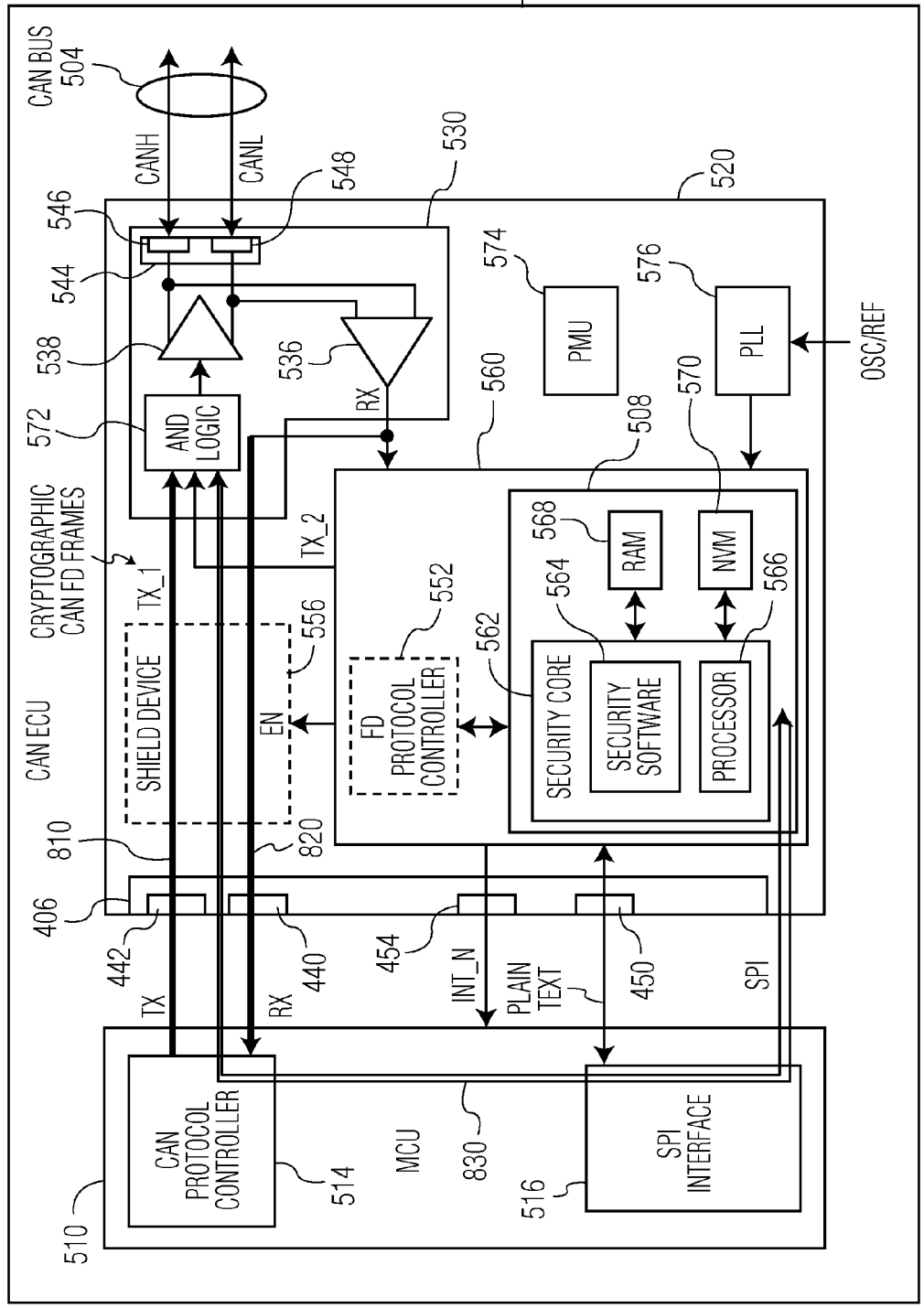
FIG. 8 illustrates another operational case of the CAN ECU of FIG. 5 for secured data communications.

FIGS. 6-8 illustrate three operational cases of the CAN ECU 502 of FIG. 5. Specifically, FIG. 6 illustrates an operational case of the CAN ECU of FIG. 5 for regular (non-secured) data communications. In the operations depicted in FIG. 6, the RX interface 440 and the TX interface 442 of the microcontroller communications interface 406 are used for regular (non-secured) communications between the classic CAN microcontroller 510 and the transceiver 520. The CAN protocol controller 514 of the classic CAN microcontroller is active (enabled) while the SPI interface 516 of the classic CAN microcontroller is inactive (disabled), as indicated by dotted lines. The CAN protocol controller generates CAN frames with an 8 Byte payload. The transceiver is used only for regular data transmission and reception. As indicated by the dotted lines, the programmable cryptographic module 508 and the FD protocol controller 552 of the transceiver are inactive (disabled) and the shield device 556 of the transceiver is inactive (bypassed). As indicated by the bold lines 610, 620, the physical communications (PHY) device 530 of the transceiver is active (enabled) and transmits data through the TX interface 442 (passing through the shield device) and receives data from the RX interface 440 (passing through the shield device).

FIG. 7 illustrates an operational case of the CAN ECU 502 of FIG. 5 for secured data communications. In the operations depicted in FIG. 7, in a data transmission mode, the classic CAN microcontroller 510 transfers plain text data information requiring cryptographic enabled communication to the transceiver 520 via the SPI interface 516 of the classic CAN microcontroller and via the SPI interface 450 of the transceiver, in a direction labeled by arrow 730. The security software 564 hosted on the security core 562 performs cryptographic operations on the plain text data received from the SPI interface 450 of the transceiver and generates cipher data output (e.g., a CMAC signature) and a counter value. The FD protocol controller 552 packages the cipher text data output (e.g., CMAC signature) and the counter value with the original data information (e.g., plain text information) to create a cryptographic CAN FD frame, "TX_2," which has a 64 Byte payload. The cryptographic CAN FD frame is transmitted via the physical communications (PHY) device 530 onto the CAN bus 504. Specifically, the AND logic 572 is used to allow one of a CAN frame, "TX_1," received from the CAN protocol controller 514 of the classic CAN microcontroller and a CAN FD frame from the FD protocol controller to be transmitted through the transmitter 538. In some embodiments, the AND logic selects one of a CAN frame from the CAN protocol controller and a CAN FD frame from the FD protocol controller with a higher priority. In an embodiment, depending on the number of leading zeros in the ID field of the data frames, the AND logic selects the data frame with the most leading zeros in the ID field as the winner of an arbitration to take control of the CAN bus for communication. Consequently, safety critical priorities are not overpowered by the security critical priorities or the vice versa.

In the operations illustrated in FIG. 7, in a data reception mode, after a CAN FD frame is detected, the shield device 556 blocks the data path to the classic CAN microcontroller 510 via the RX interface 440 and the FD protocol controller 552 decodes the received CAN FD frame to generate decoded data, which decoded data contains cipher data of the CAN FD frame. The FD protocol controller also checks the received CAN FD frame for transmission related errors and generates an acknowledgement message (ACK) for a successful reception of the received CAN FD frame. The security software 564 hosted on the security core 562 validates the cryptographic integrity of the decoded data from the FD protocol controller and converts the decoded data into plain text data. Upon a successful validation of the decoded data, the security core generates an interrupt signal, "INT_N," which causes the classic CAN microcontroller to read back the plain text data from the transceiver 520 via the SPI interfaces 516, 450, in the direction labeled by arrow 730.

FIG. 8 illustrates another operational case of the CAN ECU 502 of FIG. 5 for secured data communications. In the operations illustrated in FIG. 8, the classic CAN microcontroller 510 accesses the hardware security module functionality provided by the programmable cryptographic module 508 of the transceiver 520 via the SPI interfaces 516, 450. Instead of the FD protocol controller 552 of the transceiver 520, the classic CAN microcontroller uses the CAN protocol controller 514 to generate a CAN data frame, based on the cipher text data generated by the programmable cryptographic module. In this mode of operation, the classic CAN microcontroller relies on CMAC and counter value truncation to fit the desired/necessary data into the 8 Byte payload of a CAN frame. Comparing to generating CAN FD frames using the FD protocol controller 552, generating CAN frames at the classic CAN microcontroller can increase the network traffic due to splitting the data into multiple packages in the process of fitting signature, counter, and original data into the limited 8 byte payload and increases the collision detection probability due to CMAC truncation. In the configuration of FIG. 8, the FD protocol controller 552 of the transceiver is inactive (disabled) and the shield device 556 of the transceiver is inactive (bypassed) and the RX/TX interfaces 440, 442 are utilized for the transmission of cryptographic enabled CAN data frames, in directions indicated by bold lines 820, 810.

Figure 9:
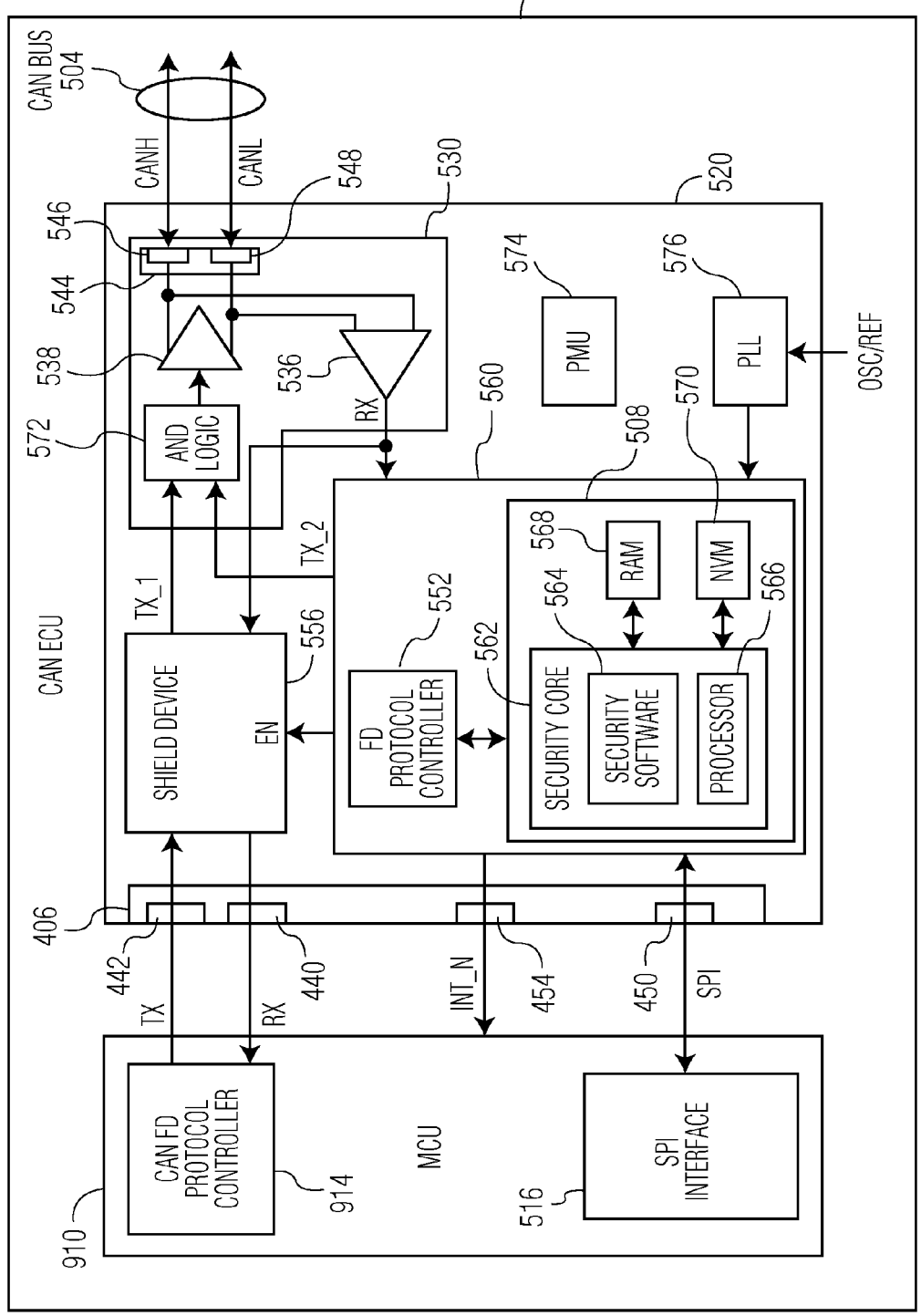
FIG. 9 depicts an embodiment of the CAN ECU depicted in FIG. 4 having a CAN FD compatible microcontroller.

FIG. 9 depicts an embodiment of the CAN ECU 402 depicted in FIG. 4 having a CAN FD compatible microcontroller 910 and the transceiver 520. In the CAN ECU 902 depicted in FIG. 9, the CAN FD compatible microcontroller 910 includes a CAN FD protocol controller 914 and the SPI interface 516. The CAN FD compatible microcontroller can process CAN frames as well as CAN FD frames. The CAN ECU depicted in FIG. 9 is one possible embodiment of the CAN ECU depicted in FIG. 4. However, the CAN ECU depicted in FIG. 4 is not limited to the embodiment shown in FIG. 9.

Figure 10:
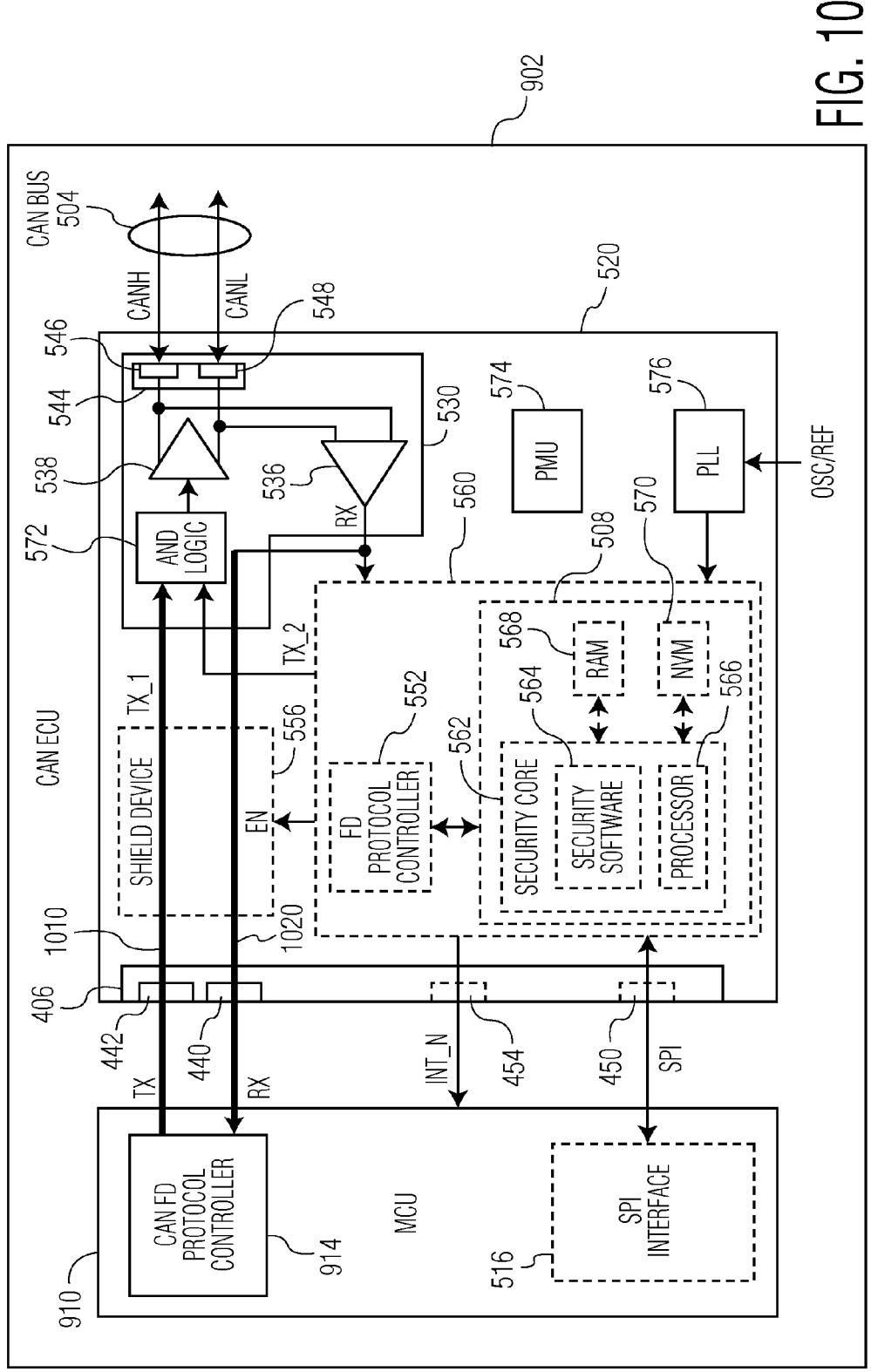
FIG. 10 illustrates an operational case of the CAN ECU of FIG. 9 for regular (non-secured) data communications.
Figure 11:
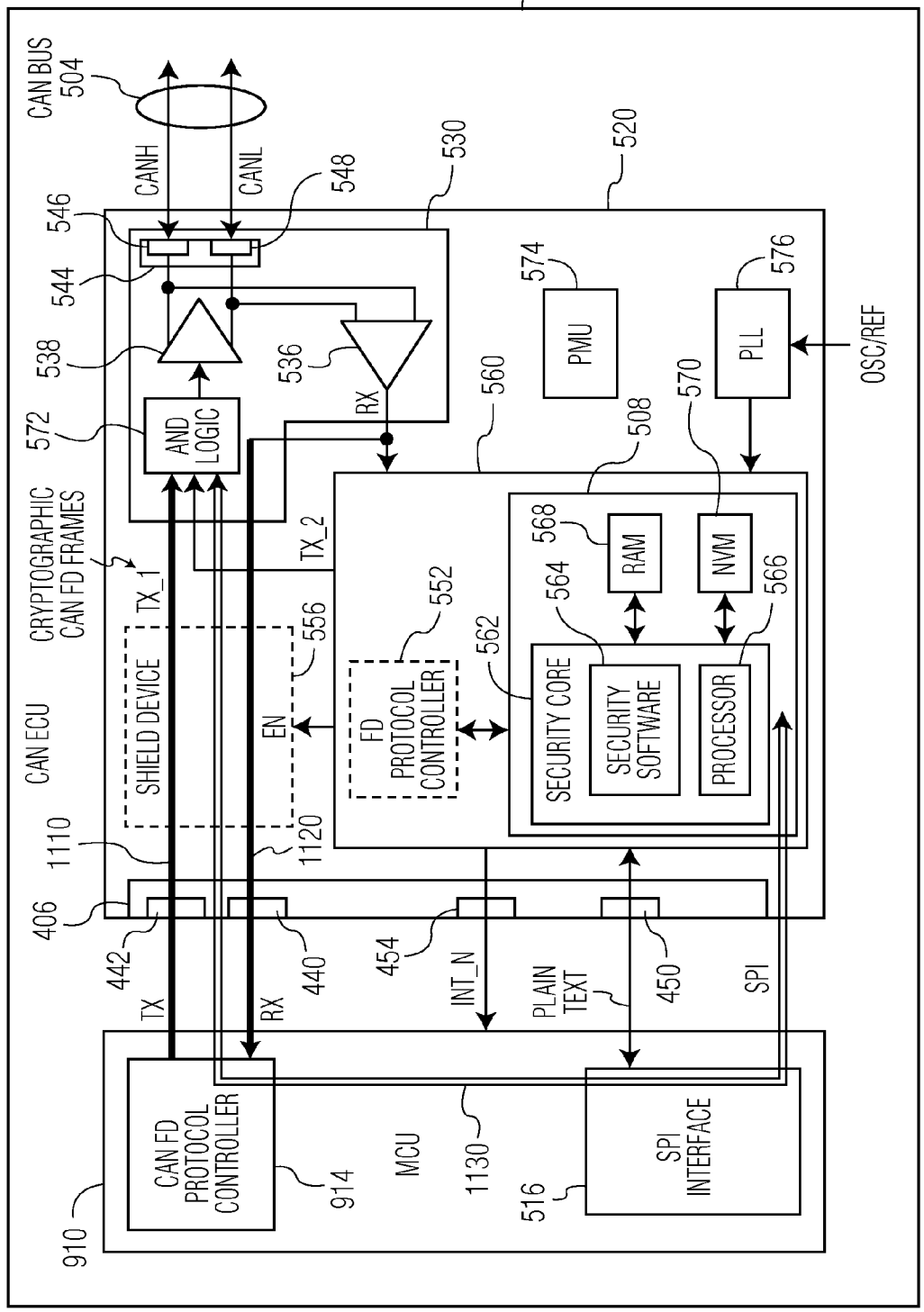
FIG. 11 illustrates an operational case of the CAN ECU of FIG. 9 for secured data communications.

FIGS. 10 and 11 illustrate two operational cases of the CAN ECU 902 depicted in FIG. 9. Specifically, FIG. 10 illustrates an operational case of the CAN ECU of FIG. 9 for regular (non-secured) data communications. In the operations illustrated in FIG. 10, the RX interface 440 and the TX interface 442 of the microcontroller communications interface 406 are used for regular (non-secured) communications between the CAN FD compatible microcontroller 910 and the transceiver 520. The CAN FD protocol controller 914 of the CAN FD compatible microcontroller is active (enabled) while the SPI interface 516 of the CAN FD compatible microcontroller is inactive (disabled). The CAN FD protocol controller 914 generates CAN frames with 64 Byte payloads. The transceiver is used only for regular data transmission and reception. As indicated by dotted lines, the programmable cryptographic module 508 and the FD protocol controller 552 of the transceiver are inactive (e.g., disabled) and the shield device 556 of the transceiver is inactive (bypassed). As indicated by bold lines 1010, 1020, the physical communications (PHY) device 530 of the transceiver is active (e.g., enabled) and transmits data through the TX interface 442 (passing through the shield device) and receives data from the RX interface 440 (passing through the shield device).

From the security perspective, a preferred mode of operation for secured data communications is using the CAN FD controller 552 of the transceiver 520 while keeping the cryptographic enabled communication processing (happening in the transceiver) isolated from the regular data processing (happening in the CAN FD compatible microcontroller 910). It is also possible to use only the programmable cryptographic module 508 of the transceiver and using the CAN FD protocol controller 914 built in the CAN FD compatible microcontroller (as in the operational case illustrated in FIG. 11). In other embodiments, instead of the FD protocol controller of the CAN FD compatible microcontroller, the FD protocol controller 552 of the transceiver is used to generate a CAN FD frame. FIG. 11 illustrates an operational case of the CAN ECU of FIG. 9 for secured data communications. In the operations illustrated in FIG. 11, for secure data communication, the CAN FD compatible microcontroller 910 accesses the hardware security module functionality provided by the programmable cryptographic module 508 of the transceiver 520 via the SPI interfaces 516, 450, in the direction labeled by arrow 1130. The plain text data is transferred to the cryptographic module, which performs the cryptographic operations and creates a cipher text (CMAC signature) and a counter value, which are used by the CAN FD protocol controller 914 of the CAN FD compatible microcontroller to create a cryptographic CAN FD frame. The FD protocol controller 552 of the transceiver is inactive (disabled) and the shield device 556 of the transceiver is inactive (bypassed). The RX/TX interfaces 440, 442 are utilized for the transmission of cryptographic enabled CAN data frames, in directions indicated by bold lines 1120, 1110.

Figure 12:
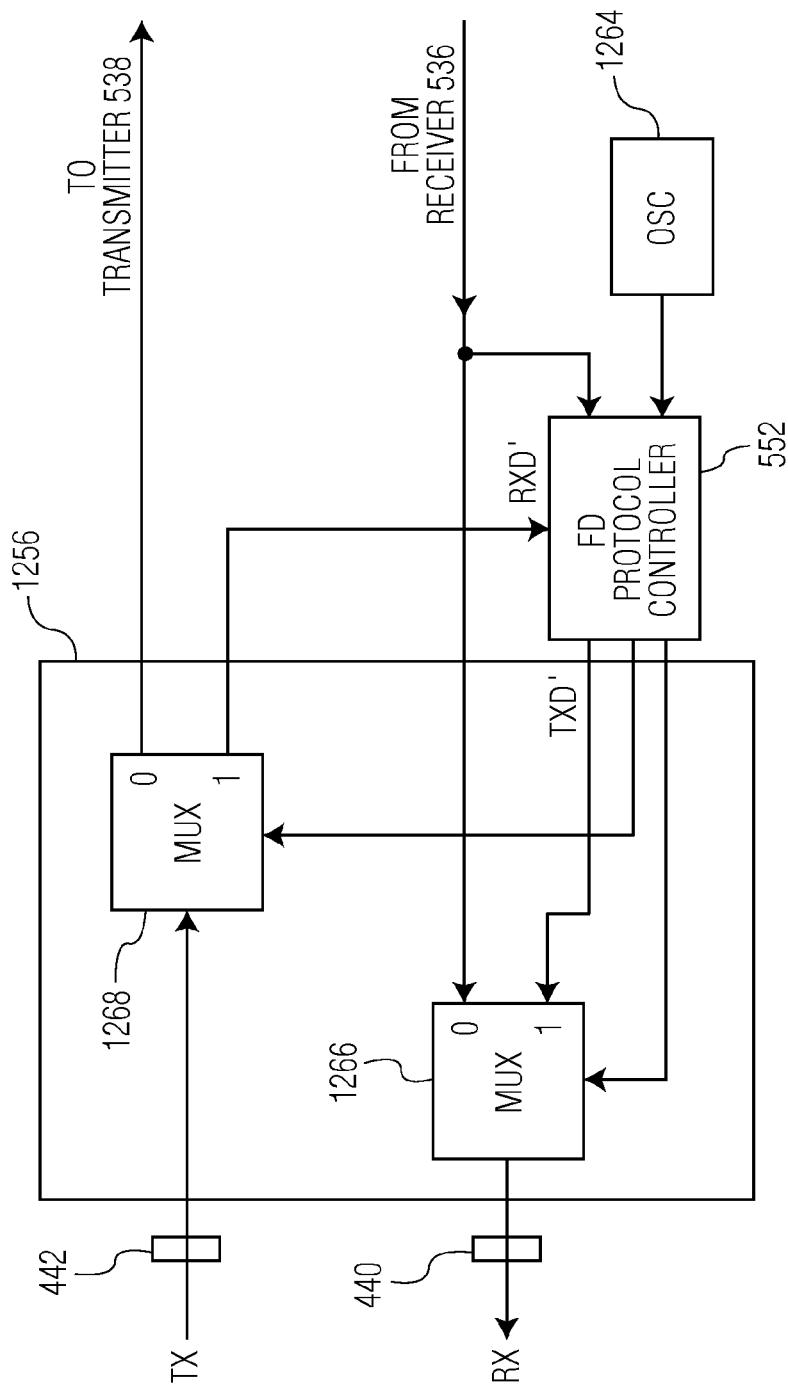
FIG. 12 depicts a first embodiment of the shield device depicted in FIG. 5.

FIG. 12 depicts a first embodiment of the shield device 556 depicted in FIG. 5. The shield device 1256 depicted in FIG. 12 is one possible embodiment of the shield device depicted in FIG. 5. However, the shield device depicted in FIG. 5 is not limited to the embodiment shown in FIG. 12. In an embodiment, the shield device 1256 is configured to implement a change in an operating state of the CAN transceiver 520, such as disconnecting the CAN protocol controller 514 of the classic CAN microcontroller 510 from the CAN bus 504, if CAN FD traffic is detected, and directing CAN FD traffic to the FD protocol controller 552. In an embodiment, the shield device 1256 includes a switching system that allows the TX interface 442 and the RX interface 440 to be independently disconnected from the CAN bus interface 544, thereby disconnecting the CAN protocol controller 514 of the classic CAN microcontroller 510 from the CAN bus 504. In the embodiment depicted in FIG. 12, the shield device is connected to the FD protocol controller 552, which is used to detect the presence of CAN FD traffic and to decode CAN FD frames. The shield device includes a receive path multiplexer 1266 and a transmit path multiplexer 1268. The FD protocol controller 552 is connected to receive serial digital data from the receiver 536, timing signals from an oscillator (OSC) 1264, and serial digital data from the TX interface (identified as RXD'). The FD protocol controller 552 is also connected to output serial digital data (identified as TXD') to the receive path multiplexer and to output multiplexer control signals (CAN_FD_Detected_TXD, CAN_Normal_Dectected_TXD, CAN_FD_Detected_RXD, and CAN_Normal_Dectected_RXD) to the receive path multiplexer and/or to the transmit path multiplexer. The receive path multiplexer is connected to receive serial digital data directly from the receiver 536 and from the FD protocol controller 552 and to output serial digital data to the RX interface from either the FD protocol controller 552 or directly from the receiver depending on the state of the receive multiplexer control signal (e.g., CAN_FD_Detected_RXD or CAN_Normal_Dectected_RXD). The transmit path multiplexer is connected to receive serial digital data from the TX interface and to output serial digital data to either the transmitter or to the FD protocol controller 552 depending on the state of a transmit multiplexer control signal (e.g., CAN_FD_Detected_TXD or CAN_Normal_Dectected_TXD).

Figure 13:
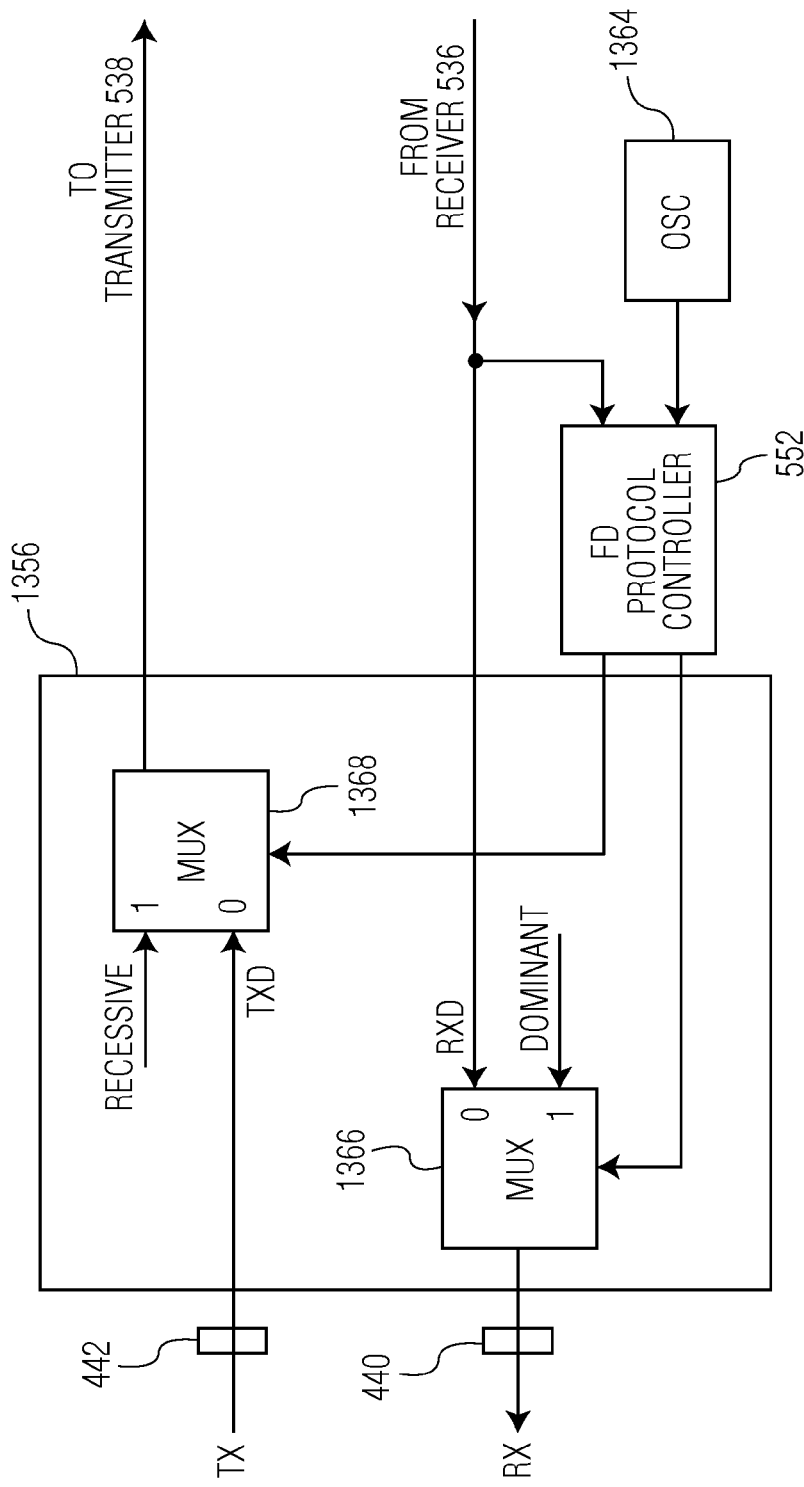
FIG. 13 depicts a second embodiment of the shield device depicted in FIG. 5.

FIG. 13 depicts a second embodiment of the shield device 556 depicted in FIG. 5. The shield device 1356 depicted in FIG. 13 is one possible embodiment of the shield device depicted in FIG. 5. However, the shield device depicted in FIG. 5 is not limited to the embodiment shown in FIG. 13. In an embodiment, the shield device 1356 includes a switching system having a receive path multiplexer 1366 and a transmit path multiplexer 1368 that allows the TX interface 442 and the RX interface 440 to be independently disconnected from the CAN bus interface 544, thereby disconnecting the CAN protocol controller 514 of the classic CAN microcontroller 510 from the CAN bus 504. In the embodiment depicted in FIG. 13, the shield device is connected to the FD protocol controller 552, which is used to detect the presence of CAN FD traffic and to decode CAN FD frames, in response to timing signals from an oscillator (OSC) 1364. The FD protocol controller 552 is connected to output multiplexer control signals to the receive path multiplexer and/or to the transmit path multiplexer. The receive path multiplexer is connected to receive serial digital data directly from the receiver and to output serial digital data to the RX interface based on the state of the multiplexer control signal. In the embodiment of FIG. 13, the receive path multiplexer is configured to output either a received signal (RXD) from the receiver 536 (state "0") or a clamped dominant RXD (state "1") depending on the state of the receive path multiplexer. The transmit path multiplexer is connected to receive serial digital data from the TX interface and to output serial digital data to the transmitter 438 based on the state of the multiplexer control signal. In the embodiment of FIG. 13, the transmit path multiplexer is configured to output either a signal to be transmitted (TXD) from the TX interface 424 (state "0") or a clamped recessive TXD (state "1") depending on the state of the transmit path multiplexer.

Figure 14:
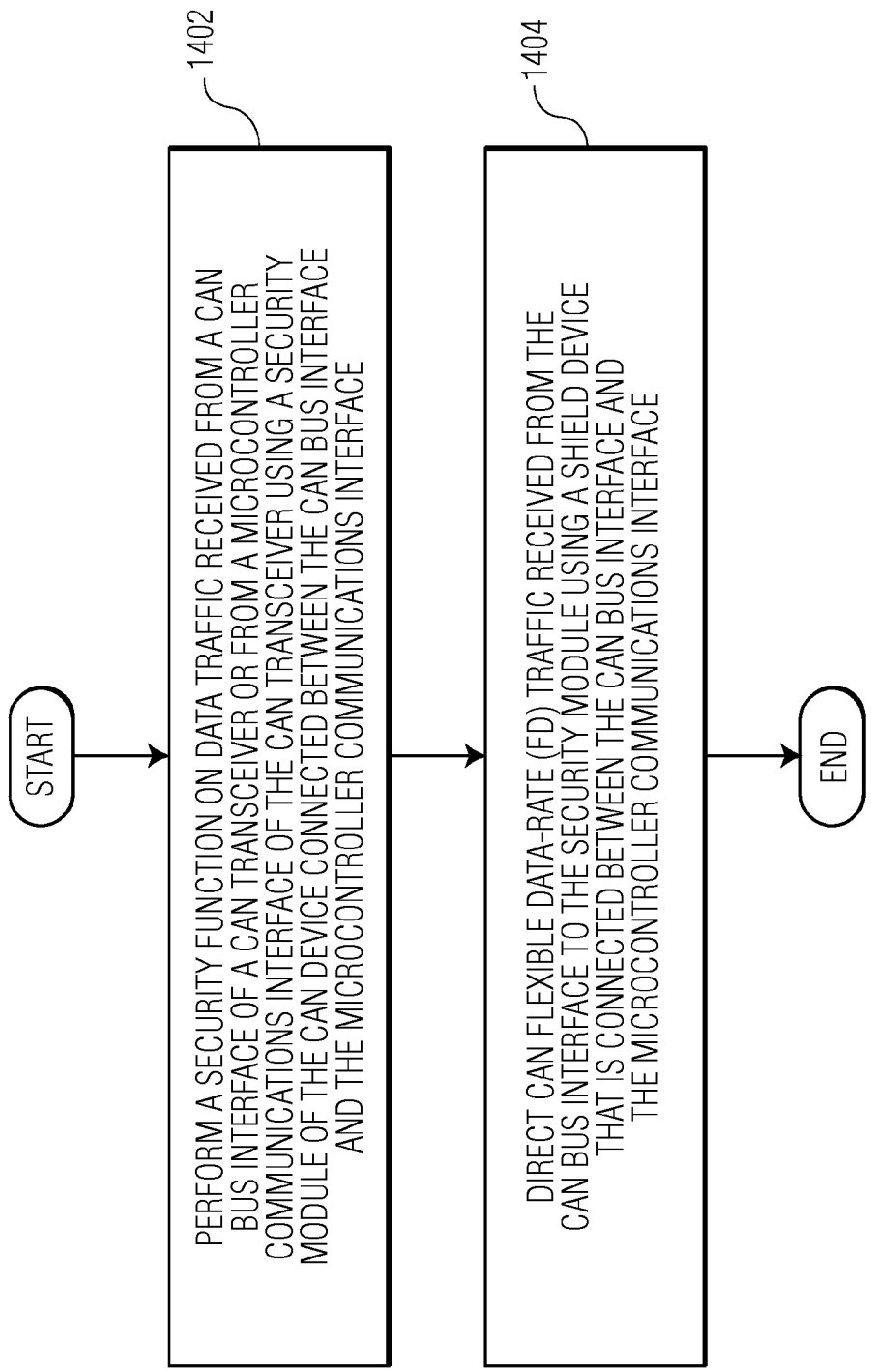
FIG. 14 is a process flow diagram of a method for operating a CAN device in accordance with an embodiment of the invention.

FIG. 14 is a process flow diagram of a method for operating a CAN device in accordance with an embodiment of the invention. At block 1402, a security function is performed on data traffic received from a CAN bus interface of a CAN transceiver or from a microcontroller communications interface of the CAN transceiver using a security module of the CAN device connected between the CAN bus interface and the microcontroller communications interface. At block 1404, CAN Flexible Data-rate (FD) traffic received from the CAN bus interface is directed to the security module using a shield device that is connected between the CAN bus interface and the microcontroller communications interface. The CAN transceiver may be the same as or similar to the CAN transceiver 120 depicted in FIG. 1, the transceiver 420 depicted in FIG. 4, and/or the CAN transceiver 520 depicted in FIG. 5.

Techniques described herein can be applied to any type of IVNs, including a CAN, a LIN, a MOST network, a FlexRay™ compatible network, and other types of IVNs. Although in some embodiments a CAN transceiver is described, it should be noted that the invention is not restricted to CAN transceivers.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A Controller Area Network (CAN) device comprising:
   a security module connected between a CAN bus interface of a CAN transceiver and a microcontroller communications interface of the CAN transceiver, wherein the security module is configured to perform a security function on data traffic received from the CAN bus interface or from a Serial Peripheral Interface (SPI) interface of the microcontroller communications interface;
   a shield device connected between the CAN bus interface and the microcontroller communications interface, wherein the shield device is configured to direct CAN Flexible Data-rate (FD) traffic received from the CAN bus interface to the security module; and
   a FD protocol controller configured to encode input data received through the SPI interface and a cipher data output that is generated by encrypting the input data received through the SPI interface to generate a CAN FD frame.

2. The CAN device of claim 1, wherein the security module comprises a programmable cryptographic module configured to execute security software programs to process the data traffic received from the CAN bus interface or the SPI interface.

3. The CAN device of claim 2, wherein the programmable cryptographic module configured to encrypt the input data received through the SPI interface to generate the cipher data output.

4. The CAN device of claim 2, wherein the programmable cryptographic module comprises:
   a security core configured to execute security software routines; and
   a memory device configured to store security configuration information for the security software routines.

5. The CAN device of claim 4, wherein the security core is configured to:
   extract a data payload from a plurality of data signals received through the microcontroller communications interface or the CAN bus interface; and
   process the data payload to generate a Cipher-based Message Authentication Code (CMAC) digest.

6. The CAN device of claim 5, wherein the FD protocol controller is configured to combine the payload with the CMAC digest to generate a CAN FD frame.

7. The CAN device of claim 2, wherein the FD protocol controller is configured to decode the CAN FD data traffic to generate decoded data, and wherein the programmable cryptographic module is further configured to decrypt the decoded data.

8. The CAN device of claim 7, wherein the programmable cryptographic module is further configured to verify a cryptographic integrity of the decoded data and to generate and transmit an interrupt signal through the microcontroller communications interface if the cryptographic integrity of the decoded data has been successfully verified.

9. The CAN device of claim 1, wherein the shield device is connected between a receive data (RX) interface and a transmit data (TX) interface of the microcontroller communications interface and the CAN bus interface, and wherein the shield device is further configured to:
   block the CAN FD traffic from reaching the microcontroller communications interface if the microcontroller communications interface is used for communications with a classic CAN microcontroller.

10. A CAN transceiver comprising the CAN device of claim 1, the CAN bus interface, the microcontroller communications interface, a transmitter, and a receiver.

11. An electronic control unit comprising the CAN transceiver of claim 10 and a microcontroller, wherein the microcontroller communications interface of the CAN transceiver is used for communications with the microcontroller.

12. A Controller Area Network (CAN) transceiver comprising:
   a CAN bus interface having a CAN high (CANH) bus interface and a CAN low (CANL) bus interface;
   a CAN microcontroller communications interface having a receive data (RX) interface, a transmit data (TX) interface and a Serial Peripheral Interface (SPI) interface;
   a security module connected between the CAN bus interface and SPI interface, wherein the security module is configured to perform a security function on data traffic received from the CAN bus interface or from the SPI interface;

a shield device connected between the CAN bus interface and the RX interface and the TX interface of the CAN microcontroller communications interface, wherein the shield device is configured to direct CAN Flexible Data-rate (FD) traffic received from the CAN bus interface to the security module; and a FD protocol controller configured to encode input data received through the SPI interface and a cipher data output that is generated by encrypting the input data received through the SPI interface to generate a CAN FD frame.

13. The CAN transceiver of claim 12, wherein the programmable cryptographic module comprises:

a security core comprising at least one of a hardware-based Advanced Encryption Standard (AES) engine, a hardware-based Secure Hash Algorithm (SHA) engine, a hardware-based counter and a hardware-based true random number generator; and a memory device configured to store security configuration information for the security core.

14. The CAN transceiver of claim 13, wherein the security core is configured to:

extract a data payload from a plurality of data signals received through the SPI interface or the CAN bus interface; and process the data payload to generate process data.

15. The CAN transceiver of claim 14, wherein the FD protocol controller is configured to combine the payload with the processed data to generate a CAN FD frame.

16. The CAN transceiver of claim 12, wherein the shield device is further configured to:

block the CAN FD traffic from reaching the CAN microcontroller communications interface if the CAN microcontroller communications interface is used for communications with a classic CAN microcontroller.

17. The CAN transceiver of claim 12, further comprising a FD protocol controller configured to decode the CAN FD data traffic to generate decoded data, and wherein the security module is further configured to:

decrypt the decoded data;

verify a cryptographic integrity of the decoded data; and generate and transmit an interrupt signal through the microcontroller communications interface if the cryptographic integrity of the decoded data has been successfully verified.

18. A method for operating a Controller Area Network (CAN) device, the method comprising:

performing a security function on data traffic received from a CAN bus interface of a CAN transceiver or from a microcontroller communications interface of the CAN transceiver using a security module of the CAN device connected between the CAN bus interface and the microcontroller communications interface;

directing CAN Flexible Data-rate (FD) traffic received from the CAN bus interface to the security module using a shield device that is connected between the CAN bus interface and the microcontroller communications interface; and encoding input data received through the microcontroller communications interface and a cipher data output that is generated by encrypting the input data received through the microcontroller communications interface to generate a CAN FD frame.

19. The method of claim 18, wherein performing the security function on the data traffic received from the CAN bus interface or the microcontroller communications interface comprises executing security software programs to encrypt or decrypt the data traffic received from the CAN bus interface or the microcontroller communications interface.

* * * * *